(12) United States Patent
Bussetti et al.

(10) Patent No.: US 11,912,624 B2
(45) Date of Patent: Feb. 27, 2024

(54) FIRE RESISTANT INTERLAYER

(71) Applicant: Saint-Gobain Glass France, Courbevoie (FR)

(72) Inventors: Lucie Bussetti, L'Isle-Adam (FR); David Te Strake, Aachen (DE); Jerome Korus, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 244 days.

(21) Appl. No.: 17/429,483

(22) PCT Filed: Feb. 11, 2020

(86) PCT No.: PCT/EP2020/053456
§ 371 (c)(1),
(2) Date: Aug. 9, 2021

(87) PCT Pub. No.: WO2020/165161
PCT Pub. Date: Aug. 20, 2020

(65) Prior Publication Data
US 2022/0106231 A1    Apr. 7, 2022

(30) Foreign Application Priority Data
Feb. 11, 2019   (EP) .................................... 19156501

(51) Int. Cl.
| C04B 14/30 | (2006.01) |
| C04B 22/04 | (2006.01) |
| C04B 28/26 | (2006.01) |
| C04B 103/00 | (2006.01) |
| C04B 111/00 | (2006.01) |
| C04B 111/28 | (2006.01) |

(52) U.S. Cl.
CPC .............. C04B 28/26 (2013.01); C04B 14/30 (2013.01); C04B 22/04 (2013.01); C04B 2103/002 (2013.01); C04B 2111/00612 (2013.01); C04B 2111/28 (2013.01)

(58) Field of Classification Search
CPC ......... C04B 28/26; C04B 14/30; C04B 22/04; C04B 2103/002; C04B 2111/00612; C04B 2111/28; C04B 28/06; C04B 2111/00; C04B 14/06; C04B 22/10; C04B 22/128; C04B 22/143; C04B 24/02; C04B 2103/00; C09K 2003/1078; C03B 5/43; C08J 7/05
See application file for complete search history.

(56) References Cited

U.S. PATENT DOCUMENTS

2012/0205600 A1* 8/2012 Holden ................ B32B 17/069
252/601
2015/0000825 A1    1/2015 Crook et al.

FOREIGN PATENT DOCUMENTS

| WO | 94/04355 | 3/1994 |
| WO | 2009/111897 | 9/2009 |

* cited by examiner

Primary Examiner — Anthony J Green
Assistant Examiner — Marites A Guino-O Uzzle
(74) Attorney, Agent, or Firm — Rankin, Hill & Clark LLP (57) ABSTRACT

The composition for preparation of a fire resistant interlayer includes an aqueous alkali silicate solution and a silicon dioxide compound. The composition has a molar ratio of silicon dioxide ($SiO_2$) to alkali metal oxide ($M_2O$) of larger than 2. The composition further includes a stabilisation agent and the stabilisation agent includes zinc (Zn).

15 Claims, 4 Drawing Sheets

FIRE RESISTANT INTERLAYER

BACKGROUND OF THE INVENTION

Field of the Invention

The invention relates to the field of fire protection, and to a composition for preparation of a fire resistant interlayer, an alkali silicate solution for preparation of a fire resistant interlayer, a fire resistant interlayer and a fire resistant element, a method for producing the fire resistant interlayer and/or the fire resistant element.

Description of Related Art

A transparent heat-protection element with a protective layer of a cured alkali-silicate between two glass planes is known, for example, from WO 94/04355. The cured layer is formed from an alkali silicate and at least one curing agent, wherein a molar ratio of silicon dioxide to alkali metal oxide ($M_2O$) which is larger than 4:1 is set in the layer. The layer is designed as an alkali silicate water glass. The initial mass for the alkali silicate water glass is a liquid mass with a water content of up to 60% and can be poured into the intermediate space between two glass plates. The high water content is retained on curing the mass, and despite this, the alkali silicate water glass has a high intrinsic strength and adhesion to the glass plates. Preferably, a lithium silicate, sodium silicate or potassium silicate or a mixture of these is applied as an alkali silicate.

A tendency to haze can be observed with protective layers of hydrous alkali silicate and silica sol as a curing agent as with WO 94/04355, in particular with time or given unfavourable environmental factors, such as long hot summers with a longer lasting effect of high temperatures, or incorrect use, and a hazing process can be initiated.

A transparent heat-protection element with at least one carrier element and at least one protective layer is disclosed in WO 2009/111897. The protective layer includes a reaction product having an aqueous alkali silicate solution and an aluminium-modified or borate-modified silicon dioxide-dispersion, in order to increase the ageing resistance of the heat-protection element.

SUMMARY OF THE INVENTION

It is therefore the object of the invention, to provide a fire resistant alternative, which has a reduced tendency to haze (opacity) and/or an improved durability.

This object is achieved by a composition for preparation of a fire resistant interlayer, an alkali silicate solution for preparation of a fire resistant interlayer, a fire resistant interlayer and a fire resistant element and a method for producing the fire resistant interlayer and/or the fire resistant element.

The composition for preparation of a fire resistant interlayer includes an aqueous alkali silicate solution, and a silicon dioxide compound. The composition has a molar ratio of silicon dioxide ($SiO2$) to alkali metal oxide ($M2O$) of larger than 2, in particular larger than 2.5, in particular larger than 4. The molar ratio of silicon dioxide ($SiO2$) to a total amount of alkali metal oxide ($M2O$) can be larger than 2, in particular larger than 2.5, in particular larger than 4. The composition includes a stabilisation agent. The stabilisation agent includes zinc (Zn), in particular zinc-ions, in particular $Zn^{2+}$-ions.

The counter ion of the zinc ion does not significantly influence the surprising stabilising function in the composition.

The addition of zinc to the composition of the fire resistant interlayer can increase the aging stability of the composition. Durability tests, where quick aging of the composition is induced by applying elevated temperatures of, e.g., 80° C. for a couple of days (e.g., for a week or longer), surprisingly revealed that the addition of zinc to a composition of the alkali silicate solution and the silicon dioxide compound improved the long-time stability of the composition. The improved stabilisation of the composition reflects in a reduced cloudiness or reduced haze/turbidity after the quick aging test/durability at 80° C. for seven days, for 14 days up to 21 days.

The stabilisation agent can include zinc, in particular zinc-ions, in particular $Zn^{2+}$-ions, in particular at least one of zinc sulphate, zinc chloride, zinc halide, zinc carbonate, zinc acetate, zinc oxide, zinc hydroxide, zincate, zinc nitrate, zinc chlorate, zinc phosphate, zinc molybdate, zinc cyanide, zinc arsenite, zinc arsenate and zinc chromate, zinc sulphide or a mixture thereof.

The composition can include 0.0005 mol/kg to 0.003 mol/kg zinc (Zn).

Due to the addition of the defined amount of 0.0005 mol/kg to 0.003 mol/kg of zinc to the composition the freezing point (FP) of the composition can be decreased. The freezing point is the temperature at which the composition freezes and builds crystals, in particular ice crystals. The decreased freezing point is advantageous when the composition is applied as fire resistant interlayer in a fire resistant element. This is because a freezing of the composition can impair the quality of the fire resistant interlayer or fire resistant element, in particular of a fire resistant glazing which is to be transported or installed in cold regions. A once frozen element might not be full transparent after unfreezing.

In other words: The addition of a certain amount of zinc to the composition can stabilise the resulting fire resistant interlayer. This can increase the stability and quality of a fire resistant element including the composition of fire resistant interlayer.

It could surprisingly be shown that the addition of zinc, in particular of zinc ions ($Zn^{2+}$), to the composition essentially free of zinc can reduce the freezing point of the composition. Surprisingly a lowering of the freezing point reduction can be achieved with a zinc concentration of 0.0005 mol/kg to 0.003 mol/kg in the composition. A higher concentration of zinc does not lead to a further decrease, but rather an increase, of the freezing point. In contrast to that, the skilled person would have expected a further decrease of the freezing point by further addition of zinc.

A stable aqueous solution for the production of fire resistant glazing with alkali metal silicate is disclosed in US 2012/205600. The solution disclosed in example 4 of US 2012/205600 includes significantly more zinc, namely 0.155 mol/kg instead of the surprising concentration effect at 0.0005 mol/kg to 0.003 mol/kg zinc in the composition.

A combined effect of lowering the freezing point (FP) and the increase of the stability of the composition allow in a combined manner for providing an improved fire resistant interlayer and fire resistant element not only being exposable to lower temperatures but also having a longer lifetime stability.

According to the present invention the composition does reveal a low freezing point in combination with a desired high molar ratio of silicon dioxide ($SiO2$) to alkali metal oxide (M2O). This enables to produce a dimensionally very stable fire resistant element, which can be exposed also to low temperatures. This synergetic effect enables for an enlarged area of application of stable fire resistant elements.

The composition can have a molar ratio of silicon dioxide (SiO2) to alkali metal oxide (M2O) of at least 4 and a freezing point can be—14.5° C. to the most.

The composition can have a molar ratio of silicon dioxide (SiO2) to alkali metal oxide (M2O) of at least 5.4 and a freezing point can be—14.5° C. to the most.

The composition can have a molar ratio of silicon dioxide (SiO2) to alkali metal oxide (M2O) of at least 5.6 and a maximum freezing point of—9.5° C.

The composition can have a molar ratio of silicon dioxide (SiO2) to alkali metal oxide (M2O) of 4-6 and a freezing point can be—15° C. to −9° C.

A large molar ratio of silicon dioxide (SiO2) to alkali metal oxide (M2O), also called modulus, leads to an undesired increase of the freezing point of the composition. The increased freezing point can be surprisingly counterbalanced by the controlled addition of zinc to the composition.

Nevertheless, a large modulus of the composition is advantageous for the stability of the interlayer in the fire resistant element and a fire resistant glazing. In contrast to that a small modulus can lead to advantageous properties of the fire resistant interlayer in the case of a fire.

The composition can further include an antifreeze agent. The antifreeze agent can be a polyol, in particular at least one of mono ethylene glycol (MEG), a diol, glycerol. The antifreeze agent can decrease the freezing point of the composition. A combined effect of antifreeze agent and zinc can surprisingly be observed. On top of the sole effect of the antifreeze agent the added zinc surprisingly further decreases the freezing point (FP) of the composition.

The composition can include 0.5% to 15%, in particular 0.5%-10%, in particular 0.5%-5.5% antifreeze agent. The composition can include 0.5% to 15, in particular 0.5%-10%, in particular 0.5%-5.5% mono ethylene glycol (MEG). The composition can include 4.5% mono ethylene glycol (MEG). The share (%) of the antifreeze agent in the composition is given in weight percent (w %).

The aqueous alkali silicate solution for preparation of a fire resistant interlayer can include a stabilisation agent. The stabilisation agent can include zinc (Zn), in particular zinc-ions, in particular Zn2+-ions ($Zn^{2+}$-ions), in particular at least one of zinc sulphate, zinc chloride, zinc halide, zinc carbonate, zinc acetate, zinc oxide, zinc hydroxide, zincate, zinc nitrate, zinc chlorate, zinc phosphate, zinc molybdate, zinc cyanide, zinc arsenite, zinc arsenate and zinc chromate, zinc sulphide or a mixture thereof.

Surprisingly, the addition of the stabilisation agent, in particular the addition of zinc, can stabilise the aqueous alkali silicate solution. Such a stabilised alkali silicate solution can be stored at ambient temperature for at least three days or longer up to months. The long storage of the alkali silicate solution can improve the handling of the alkali silicate solution and the quality of the composition for the fire resistant interlayer. The shelf life of the stabilised alkali silicate solution can be significantly increased. The zinc concentration in the stabilised alkali silicate solution can be adjusted according to the desired modulus and/or concentration in the resulting interlayer. In contrast to that the usage of strongly aged aqueous alkali silicate solution without the stabilisation agent results in a cloudy product/fire resistant interlayer.

The fire resistant interlayer can be arrangeable between at least two support elements. The fire resistant interlayer can be made using a composition as described above.

This makes it possible to provide an improved interlayer with at least a reduced cloudiness or reduced haze/turbidity.

The support element can be a glass pane. The support element can include glass. The support element, in particular the flat support element, in most cases can be considered as transparent support element, in particular flat glass pane. The support element can also be made of a ceramic glass, in particular a vitroceramic. The support element can be a special bent glass pane. Thermally or possibly chemically prestressed glass can be particularly favourable. A support element can include a polymer (e.g., from polycarbonates or polymethyl methacrylate (PMMA; acrylic glass), partially crystalline glass (ceramic glass) or a composite system with glass elements and plastic carriers. Such composite systems are also considered as alternatives to glass based on silicon oxide. The support element can also include glass on a borosilicate basis. In other words: The support element, in particular a transparent and/or translucent support element, can include a silicon based glass, a borosilicate, vitroceramic, a polymer based pane and/or other types of glass. The support element can be a tempered glass/single pane safety glass. The support element can be any glass like material with safety characteristic and/or a composite glass.

The fire resistant element can include at least two support elements and a transparent fire resistant interlayer as described above. The fire resistant interlayer can be arranged between two essentially parallel support elements.

This makes it possible to provide an improved fire resistant element with at least a reduced cloudiness or reduced haze/turbidity.

The fire resistant interlayer can be transparent and/or translucent. This means that light can shine through the fire resistant interlayer. Independently thereof, the supporting element can be transparent and/or translucent. This means that light can shine through the support element. A transparent interlayer in a combined use with transparent supporting elements can provide a fire resistant glazing.

A fire resistant element can be a fire protection element. The term fire-protection element respectively fire resistant element is not to be understood as being limited to certain materials (specifically: glass in the narrow context), but includes constructions with support elements of the above mentioned and other materials. In particular the fire resistant element can be a fire protection glazing—not restricted to the supporting element including glass in a narrow sense.

The fire resistance or heat resistance respectively fire protection or fire resistance can be considered as the ability of the element respectively glazing to form an effective barrier against the spread of flames, smoke and hot steams and/or prevent the transmission of heat radiation. A fire resistance respectively fire resistance duration is defined as the minimum fire resistant time during which the fire resistant element under examination meets standardized requirements including defined boundary conditions (EN 1364-1 and −3 and EN 1363-1 and −2, date of 2017) and certain temperature stress. For example, such standard requirements of EN 13502-2 are listed respectively defined. These requirements allow the classification of fire protection elements as fire resistant element. The fire resistance is thus a measure of the usability of the element in case of fire. In other words: during the fire resistance duration the passage of fire and heat through the fire resistant element is prevented. Thus, a physical barrier for fire under fire conditions (EN 1363) is ensured. In addition to the physical fire barrier the fire resistant element can provide respectively fulfil additional functions such as for example a heat insulation.

The interval during which the fire resistant interlayer respectively fire resistant element is tested (according to the corresponding standards requirements), allows classification of the fire resistant element. The fire resistant elements can be classified as follows according to the standard EN 13501 (as of December 2016). For example, the following classes are distinguished:

Classification E (fire integrity: fire-tight room closure) classifies space-confining structural elements according to their guarantee a tightness against smoke and hot gases.

Classification EW (fire-tight room closure and insulation) specifies the heat insulation properties under influence of fire, with a reduction of the heat radiation.

Classification EI (fire-tight room closure and isolation) specifies space-confining structural elements according to their ability to meet the requirements of class E and additionally form an insulation against heat (radiation, heat conduction). Thereby the average temperature must not be increased by 140 K on average on the cold side and no individual spots rise on the cold side must not exceed 180 K. For example, a fire protection construction element of the class EI 30 can withstand a fire for 30 minutes, a fire protection construction element of the class EI 90 can withstand a fire for at least 90 minutes and limits the temperature on the cold side to a maximum temperature raise by 140 K in average without any individual spots above a 180 K raise, during this time. The fire resistant element can be an EI-rated element. In particular the fire resistant element provides afire-tight room closure and isolation for at least 15 minutes, in particular at least 30 minutes. The fire resistant element can be classified at least as EI 15, in particular at least EI 30, element.

Classification times for the fire resistant element are specified for each classification in minutes, wherein the classifying times: 15, 20, 30, 45, 60, 90, 120, 180, or 240 are to be used. The fire resistance duration/period is thus defined to be at least 15 minutes. In general, a fire resistant element thus fulfills at least 15 minutes the appropriate criteria or requirements (see Classification—EN 13501-2, date of December 2016) for fire resistance. The minimum criterion is the physical fire barrier (fire integrity: smoke and fire-tight room closure). A fire resistant element must therefore be classified at least as E15.

The fire resistant element can be a fire resistant glazing.

The method for manufacturing a fire resistant interlayer, in particular the method for manufacturing a fire resistant interlayer as described above, in particular the method for manufacturing a transparent interlayer, can include the steps of:
  providing an aqueous alkali silicate solution, in particular the alkali silicate solution as described above and
  providing a silicon dioxide compound,
  adding a stabilisation agent,
  curing the composition including the alkali silicate solution, the silicon dioxide compound and the stabilisation agent to form the fire resistant interlayer.

The stabilisation agent can include zinc (Zn), in particular zinc-ions, in particular Zn2+-ions, in particular at least one of zinc sulphate, zinc chloride, zinc halide, zinc carbonate, zinc acetate, zinc oxide, zinc hydroxide, zincate, zinc nitrate, zinc chlorate, zinc phosphate, zinc molybdate, zinc cyanide, zinc arsenite, zinc arsenate and zinc chromate, zinc sulphide or a mixture thereof.

Zinc can be added to at least one of the aqueous alkali silicate solution, the silicon dioxide compound, an antifreeze agent, which may be added and a composition including an alkali silicate solution and a silicon dioxide compound. Zinc can be added to the mixture of the aqueous alkali silicate solution and the silicon dioxide compound.

The added stabilisation agent can have a concentration of 0.0005 mol/kg to 0.003 mol/kg in the interlayer, in particular the concentration of zinc in the interlayer can be 0.0005 mol/kg to 0.003 mol/kg.

This makes it possible to provide a fire resistant interlayer that can be applied in fire resistant elements installed in cold regions, as the stabilisation agent can also in a combined effect decrease the freezing point of the interlayer. Additionally, the stabilisation agent, in particular zinc, improves the stability of the interlayer and increases the transparency of the interlayer in quick aging/durability tests and also in standard condition of use, similar as described above.

The method for manufacturing a fire resistant element, in particular the method for manufacturing a fire resistant element as described above, can include the steps of:
  providing at least a first and a second support element;
  assembling the first support element, the second support element and sealing means such that the first support element and the second support element are spaced apart from one another and form together with the sealing means an internal space with an opening;
  providing an aqueous alkali silicate solution, in particular an alkali silicate solution as described above;
  providing a silicon dioxide compound;
  providing a stabilisation agent, the stabilisation agent can include zinc, in particular zinc-ions, in particular Zn2+-ions, in particular at least one of zinc sulphate, zinc chloride, zinc halide, zinc carbonate, zinc acetate, zinc oxide, zinc hydroxide, zincate, zinc nitrate, zinc chlorate, zinc phosphate, zinc molybdate, zinc cyanide, zinc arsenite, zinc arsenate and zinc chromate, zinc sulphide or a mixture thereof;
  mixing the aqueous alkali silicate solution, the silicon dioxide compound and the stabilisation agent as a composition; in particular the concentration of zinc in the composition can be 0.0005 mol/kg to 0.003 mol/kg;
  filling the composition into the internal space;
  closing the opening of the internal space.

After closing the internal space, the composition can be cured.

Thus, it becomes possible to provide an improved fire resistant element which exhibits an improved stability and increased transparency in combination with a lowering of the freezing point.

Additionally, an antifreeze agent as described above can be provided and added to the composition.

Zinc can be used as stabilisation agent in a composition for preparation of a fire resistant interlayer. The interlayer can include an aqueous alkali silicate solution and a silicon dioxide compound. The composition can have a molar ratio of silicon dioxide (SiO2) to alkali metal oxide (M2O) of larger than 2, in particular larger than 2.5, in particular larger than 4. The molar ratio of silicon dioxide (SiO2) to a total amount of alkali metal oxide (M2O) can be larger than 2, in particular larger than 2.5, in particular larger than 4.

Due to this an improved composition with increased stability can be obtained.

Zinc can be used as a stabilisation agent in the aqueous alkali silicate solution, the composition for preparation of the fire resistant interlayer, in the fire resistant interlayer and/or the fire resistant element.

This increases the long term stability, durability and/or shelf life of the aqueous alkali silicate solution. This makes it possible to store and transport the aqueous alkali silicate solution reliably without affecting the stability or transparency of the composition, the fire resistant interlayer and/or the fire resistant element in which the aqueous alkali silicate solution is combined with the silicon dioxide compound.

Zinc can be used as stabilisation agent at least in a fire resistant interlayer. Similar to the description above the fire resistant interlayer can be arrangeable between at least two support elements. The fire resistant interlayer can be made using a composition including an aqueous alkali silicate solution and a silicon dioxide compound. The composition can have a molar ratio of silicon dioxide ($SiO_2$) to alkali metal oxide ($M_2O$) of larger than 2, in particular larger than 2.5, in particular larger than 4.

Zinc might also be used as stabilisation agent at least in a fire resistant element including at least two support elements and a transparent fire resistant interlayer. The interlayer can be made using a composition including an aqueous alkali silicate solution and a silicon dioxide compound. The composition can have a molar ratio of silicon dioxide ($SiO_2$) to alkali metal oxide ($M_2O$) of larger than 2, in particular larger than 2.5, in particular larger than 4. The interlayer can be arranged between two essentially parallel support elements.

Similar to the above described zinc can be used with a concentration of 0.0005 mol/kg to 0.003 mol/kg in the composition.

BRIEF DESCRIPTION OF THE DRAWINGS

The subject matter of the invention will be explained in more detail in the following text with reference to exemplary embodiments which are illustrated in the attached drawings, in which.

DETAILED DESCRIPTION OF THE INVENTION

The reference symbols used in the drawings, and their meanings, are listed in summary form in the list of reference symbols. In principle, identical parts are provided with the same reference symbols in the figures.

FIG. 1 shows three containers with mixed compositions of an aqueous alkali silicate solution and a silicon dioxide compound. The composition has a molar ratio (M) of silicon dioxide ($SiO_2$) to alkali metal oxide ($M_2O$) of larger than 4.77, abbreviated: M4.77. The composition further includes 4.5 w % mono ethylene glycol (MEG) (w % is given as weight percent).

The container to the left serves as reference (REF), where no further additives (ADD) are added. The container to the right includes an additional 5 Vol % zinc sulphate ($ZnSO_4$) solution in the composition, wherein the zinc sulphate has a concentration of 0.05 mol/L. The container in the middle includes an additional 5 Vol % zinc sulphate ($ZnSO_4$) solution with a concentration of 0.1 mol/L in the composition.

Figure 1A:
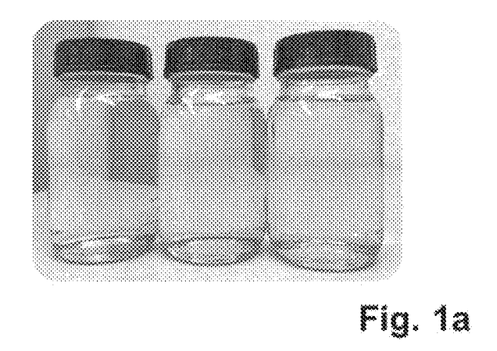
FIG. 1 shows three container with mixed compositions a) freshly, b) after seven days and c) after 14 days of a durability test.
Figure 1B:
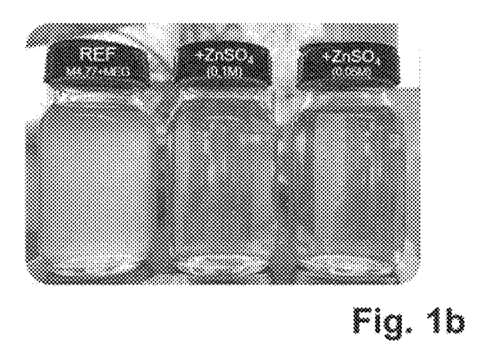
Figure 1C:
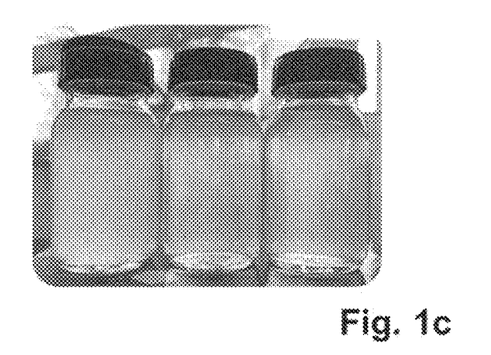

The freshly mixed composition in all three containers as shown in FIG. 1a is transparent. After applying the three containers to elevated temperatures of 80° C. for a seven days (FIG. 1b) the reference sample (REF) to the left (without zinc) reveals a significant clouding and turbidity. The both samples with added zinc (right—5 Vol % 0.05 M ZnSO4; middle—5 Vol % 0.1 M ZnSO4) surprisingly revealed that the addition of zinc to a composition of the alkali silicate solution and the silicon dioxide compound improved the aging stability of the composition, as the composition remained transparent.

After further seven days of applying elevated temperatures of 80° C. (FIG. 1c) the reference sample (without zinc) to the left shows even more clouding and turbidity. However, after a total of 14 days of applying elevated temperatures of 80° C. also the samples with additional 5 Vol % 0.05 M ZnSO4 solution (right) and 5 Vol % of 0.1 M ZnSO4 solution (middle) show some clouding and turbidity.

Overall, the zinc acts as a stabilisation agent and reduces clouding and turbidity of the composition including aqueous alkali silicate solution and a silicon dioxide compound.

Figure 2:
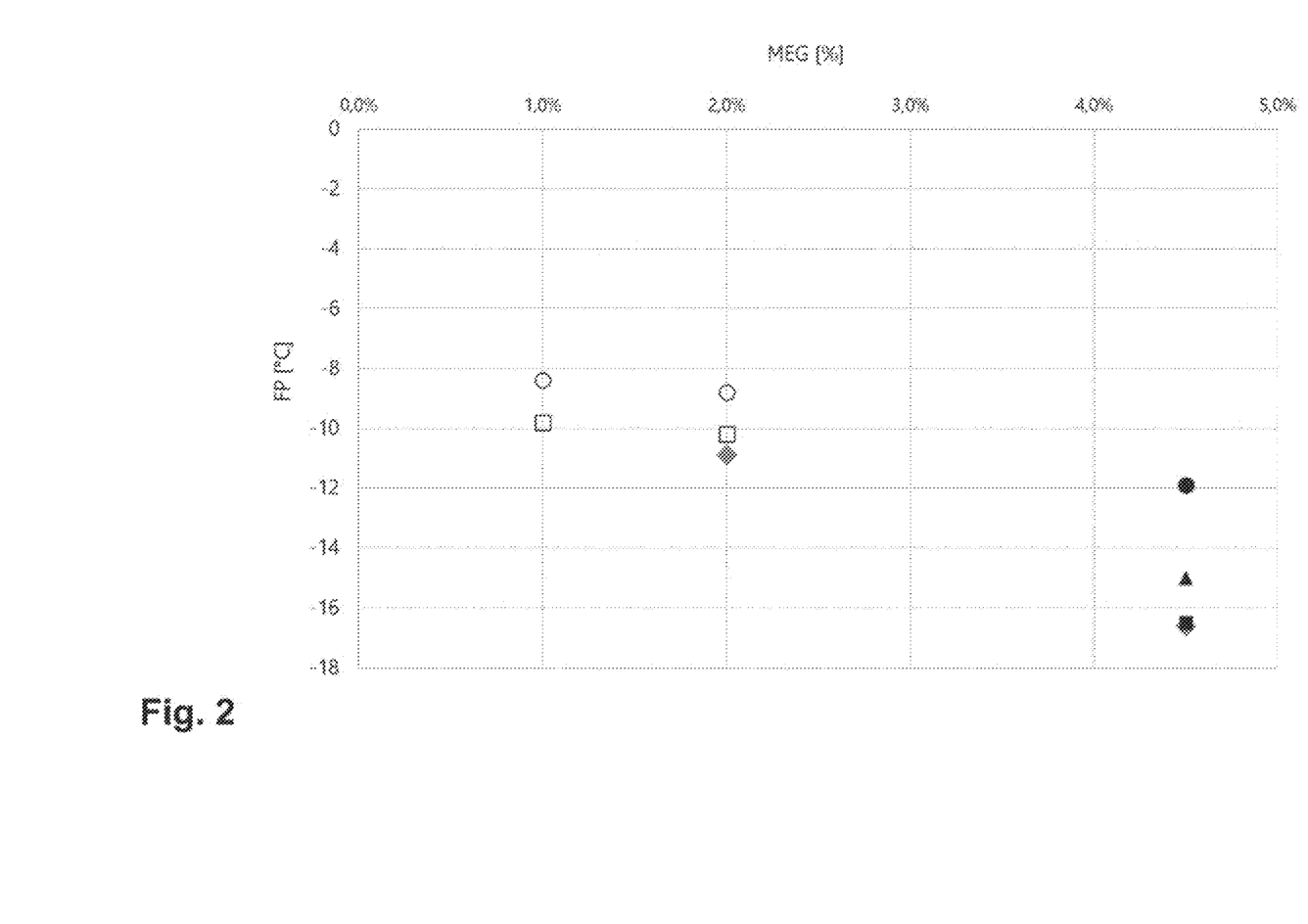
FIG. 2 shows a diagram depicting the development of the freezing point (FP) due to addition of mono ethylene glycol (MEG) and zinc to a composition.

FIG. 2 depicts a diagram showing the freezing point (FP) of the composition of aqueous alkali silicate solution and a silicon dioxide compound for several samples with addition of mono ethylene glycol (MEG) and zinc.

The freezing point (FP) is the temperature at which the composition freezes and builds crystals, in particular ice crystals. The decreased freezing point is advantageous when the composition is applied as fire resistant interlayer in a fire resistant element. This is because a freezing of the composition can impair the quality of the fire resistant interlayer or fire resistant element, in particular of a fire resistant glazing that is to be applied in cold regions. A once frozen element might not be full transparent after unfreezing.

The molar ratio of silicon dioxide ($SiO_2$) to alkali metal oxide ($M_2O$), also called modulus, is a measure for the dimensional stability of the composition. The higher modulus the higher is the dimensional stability. Accordingly, a large modulus is desired. Nevertheless, a large modulus leads to an undesired increase of the freezing point of the composition. The increased freezing point (FP) can be surprisingly be counterbalanced by controlled the addition of zinc to the composition.

FIG. 2 shows the freezing point of compositions with three different moduli, namely a high modulus of 5.6 (empty signs [circle ○ and square □]), a modulus of 5.4 (filled signs [circle ●, square ■ and triangle ▲]) and a lower modulus of 5.07 (grey rhombus [♦]) as reference.

The compositions were modified by adding certain, fixed amounts of mono ethylene glycol (MEG) as antifreeze agent. For samples with a modulus of 5.6 a MEG content of 1% and 2% was tested. Samples with a modulus of 5.4 were tested with a MEG content of 4.5%. The content is given as share of the total volume of the composition (Vol %).

In further samples the stabilisation agent zinc was added to the composition (square and triangle). The compositions include per 100 g 5 mL of a zinc sulphate solution with a concentration of 0.05 mol/L (square [■—modulus=5.6; □—modulus=5.4]) or with a concentration of 0.1 mol/L (triangle [▲—modulus=5.6]). This corresponds to an overall zinc concentration of 0.025 mol/L or 0.005 mol/L in den composition.

It can surprisingly be seen, that the addition of zinc results in a reduction of the freezing point (FP) for all compositions, independent of the modulus of the composition and independent from the content of the antifreeze agent MEG (difference between circle and square). Furthermore, FIG. 2 reveals that with the addition of 5 mL per 100 g composition of 0.05 molar zinc solution the freezing point of a reference sample with a lower modulus (modulus (reference)=5.07) can be approached. This is illustrated by the close proximity of the grey rhombus (♦—modulus=5.07, no zinc) and the squares (■—modulus=5.6, c(Zn)=0.025 mol/L; □—modulus=5.4, c(Zn)=0.025 mol/L).

Additionally, it can be shown that a further increase of the zinc concentration in the composition does not lead to a further decrease of the freezing point, as expected by the skilled person, but rather causes a slight increase of the freezing point ([▲—modulus=5.6, c(Zn)=0.005 mol/L). Accordingly, the effect of the additional zinc in the composition surprisingly only leads to a decrease of the freezing point in a certain range of the zinc concentration.

Figure 3:
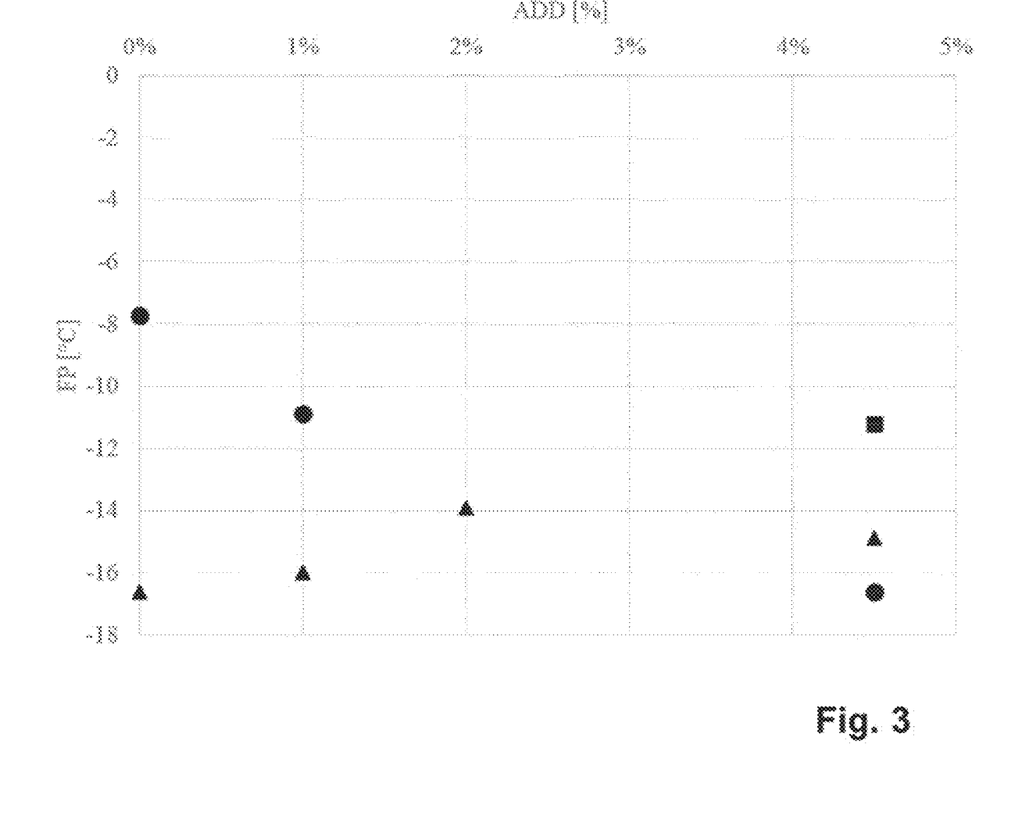
FIG. 3 shows a diagram depicting the effect of additives (ADD) on the freezing point (FP) of a composition.

In order to verify the positive effect of zinc on the freezing point reference measurements without zinc were performed as shown in FIG. 3. FIG. 3 depicts the freezing point (FP) of several compositions with different additives (ADD) in different shares. As explained above, the share of the additive (ADD) is given in Vol %.

All measurements were performed on compositions with a modulus of 5.07. In a first set of samples the amount of MEG as additive is increased from 0% to 4.5% (circles—● [ADD=MEG]). For this set a systematic decrease of the freezing point of the composition is observed. In a second set of samples the amount of MEG is hold constant at 4.5% and water (H2O) is added as additive. The corresponding results are shown as triangles (▲—ADD=H2O+4.5% MEG). For this set of samples, a slight increase of the freezing point is observed. The pure addition of 4.5% of water as additive (ADD) is shown a square (■—ADD=H2O).

From the results depicted in FIG. 3 it becomes clear that an addition of a solution to a composition containing MEG and not containing zinc leads to a decrease of the freezing. In contrast to that the addition of zinc leads to a decrease of the freezing point (FP) as shown in FIG. 2.

Figure 4:
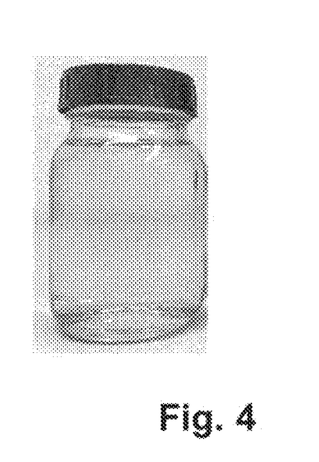
FIG. 4 shows a cured composition.

FIG. 4 shows a transparent composition including an aqueous alkali silicate solution and a silicon dioxide compound with a modulus of 4.77 and with 4.5% MEG. The alkali silicate solution was supplemented with zinc as as stabilisation agent and was aged for three days at 80° C. This illustrates the stabilisation effect of zinc on the aqueous alkali silicate solution.

FIG. 5 two containers with a composition including an aqueous alkali silicate solution and a silicon dioxide compound. The composition has a modulus of 4.77 and includes 4.5% MEG. The composition in the left container includes 5 Vol % water and the composition in the right container includes 5 Vol % of a 0.3 molar zinc sulphate solution.

Figure 5A:
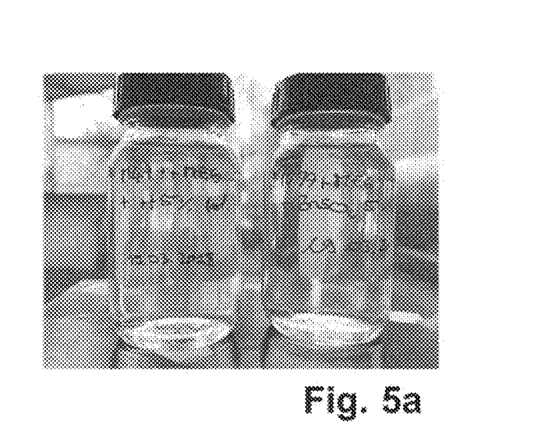
FIG. 5 shows the effect of zinc as stabilisation agent in a composition with two containers including a composition a) after 1 day and b) after 14 days of a quick aging test.
Figure 5B:
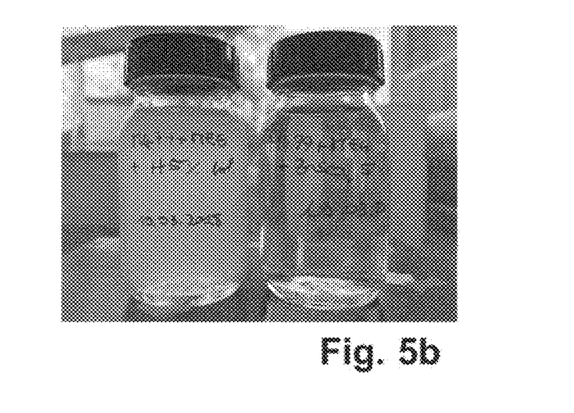

FIG. 5a) shows a freshly mixed and 5b) the composition after 14 days of a quick aging test at elevated temperatures of 80° C. It can be clearly seen, that zinc improves the stability of the composition and reduces the clouding and turbidity of the composition.

While the invention has been described in present preferred embodiments of the invention, it is distinctly understood that the invention is not limited thereto, but may be otherwise variously embodied and practised within the scope of the claims.

The invention claimed is:

1. A composition for preparation of a fire resistant interlayer comprising
an aqueous alkali silicate solution and
a silicon dioxide compound,
wherein the composition has a molar ratio of silicon dioxide (SiO2) to alkali metal oxide (M2O) of larger than 2,
wherein the composition comprises a stabilisation agent wherein
the stabilisation agent comprises zinc (Zn),
whereby the composition comprises 0.0005 mol/kc to 0.003 mol/kc zinc.

2. The composition according to claim 1, wherein
the composition has a molar ratio of silicon dioxide (SiO2) to alkali metal oxide (M2O) of 4-6 and a freezing point of −15° C. to −9° C.

3. The composition according to claim 1, further comprising an antifreeze agent.

4. The composition according to claim 3, wherein at least one on the following statements is true:
the antifreeze agent is mono ethylene glycol (MEG);
the composition comprises 0.5% to 15% antifreeze agent;
the composition comprises 0.5% to 15% mono ethylene glycol (MEG).

5. The aqueous alkali silicate solution according to claim 3, wherein the stabilisation agent comprises zinc-ions.

6. The composition according to claim 5, wherein the stabilization agent comprises Zn2+-ions.

7. The composition according to claim 6, wherein the stabilization agent comprises at least one of zinc sulphate, zinc halide, zinc carbonate, zinc acetate, zinc oxide, zinc hydroxide, zincate, zinc nitrate, zinc chlorate, zinc phosphate, zinc molybdate, zinc cyanide, zinc arsenite, zinc arsenate and zinc chromate, zinc sulphide or a mixture thereof.

8. The composition according to claim 1, wherein the stabilisation agent comprises zinc-ions.

9. The composition according to claim 8, wherein the stabilization agent comprises Zn2+-ions.

10. The composition according to claim 1, wherein the composition has a molar ratio of silicon dioxide (SiO2) to alkali metal oxide (M2O) of larger than 2.5.

11. The composition according to claim 1, wherein the composition has a molar ratio of silicon dioxide (SiO2) to alkali metal oxide (M2O) of larger than 4.

12. The composition according to claim 1, wherein the stabilization agent comprises at least one of zinc sulphate, zinc halide, zinc carbonate, zinc acetate, zinc oxide, zinc hydroxide, zincate, zinc nitrate, zinc chlorate, zinc phosphate, zinc molybdate, zinc cyanide, zinc arsenite, zinc arsenate and zinc chromate, zinc sulphide or a mixture thereof.

13. A fire resistant interlayer,
wherein the fire resistant interlayer is arrangeable between at least two support elements, and
wherein the fire resistant interlayer is made using a composition according to claim 1.

14. A fire resistant element comprising at least two support elements and a transparent fire resistant interlayer according to claim 13,
wherein fire resistant interlayer is arranged between two essentially parallel support elements.

15. A method for manufacturing a fire resistant element according to claim 14, comprising the steps of:
providing at least a first and a second support element;
assembling the first support element, the second support element and sealing means such that the first support element and the second support element are spaced apart from one another and form together with the sealing means an internal space with an opening;
providing an aqueous alkali silicate solution;
providing a silicon dioxide compound;
providing a stabilisation agent, the stabilisation agent comprising at least one of zinc, zinc-ions, and Zn2+-ions;
mixing the aqueous alkali silicate solution, the silicon dioxide compound and the stabilisation agent as a composition;
filling the composition into the internal space;
closing the opening of the internal space.

* * * * *